(12) United States Patent
Hixson et al.

(10) Patent No.: US 9,121,189 B2
(45) Date of Patent: Sep. 1, 2015

(54) PORTABLE SOLAR KIOSK (76) Inventors: Mark M. Hixson, Hixson, TN (US); Robert P. Creswell, Chattanooga, TN (US)

(*) Notice: Subject to any disclaimer, the term of this patent is extended or adjusted under 35 U.S.C. 154(b) by 363 days.

(21) Appl. No.: 13/567,045

(22) Filed: Aug. 4, 2012

(65) Prior Publication Data

US 2013/0033222 A1 Feb. 7, 2013

Related U.S. Application Data

(60) Provisional application No. 61/515,825, filed on Aug. 5, 2011.

(51) Int. Cl.
| | |
|---|---|
| *H01M 10/44* | (2006.01) |
| *H01M 10/46* | (2006.01) |
| *E04H 1/12* | (2006.01) |
| *H02J 7/00* | (2006.01) |
| *H01L 31/042* | (2014.01) |
| *H02J 7/35* | (2006.01) |

(52) U.S. Cl.
CPC ............ *E04H 1/1222* (2013.01); *E04H 1/1211* (2013.01); *H02J 7/00* (2013.01); *H02S 20/00* (2013.01); *H02J 7/35* (2013.01); *Y02E 10/50* (2013.01)

(58) Field of Classification Search
CPC ............ H02J 7/35; H02J 7/355; H02J 3/385; H02J 5/005; H02J 7/0024; H01M 10/4257; H01M 2/1022; H01M 10/443; H01M 2/1083
USPC .................. 320/101, 107, 108, 162, 163, 155
See application file for complete search history.

(56) References Cited

U.S. PATENT DOCUMENTS

| | | | |
|---|---|---|---|
| 6,123,010 A * | 9/2000 | Blackstone | 99/284 |
| 6,201,181 B1 | 3/2001 | Azzam et al. | |
| 6,263,674 B1 * | 7/2001 | Fileman et al. | 60/641.9 |
| 2002/0092426 A1 * | 7/2002 | Leggi | 99/330 |
| 2010/0060229 A1 * | 3/2010 | Benn et al. | 320/101 |
| 2010/0139645 A1 * | 6/2010 | Whipple et al. | 126/576 |

* cited by examiner

*Primary Examiner* — Brian Ngo
(74) *Attorney, Agent, or Firm* — Crose Law LLC; Bradley D. Crose (57) ABSTRACT

A portable solar kiosk is provided. The solar kiosk is configured for use with vending machines, outdoor kitchens, parking lot payment booths, bus stop waiting areas, and the like, as well as associated battery systems, solar power assemblies, traditional power access, wiring systems and harnesses, and so forth. The solar kiosk includes a multiplicity of solar panels. The multiplicity of solar panels can charge batteries to power a vending machine. The solar kiosk includes side beams supported by a base such that the solar panel array can swivel on swivel rod to an appropriate angle to the sun. The base of the solar kiosk can support battery bank assemblies.

19 Claims, 9 Drawing Sheets

PORTABLE SOLAR KIOSK

CROSS-REFERENCE TO RELATED APPLICATION(S)

The present non-provisional patent application claims the benefit of priority of U.S. Provisional Patent Application No. 61/515,825, which is entitled "PORTABLE SOLAR KIOSK", which was filed on Aug. 5, 2012, and which is incorporated in full by reference herein.

FIELD OF THE INVENTION

The technology described herein relates generally to the fields of kiosks, alternative power sources, and traditional power sources. More specifically, this technology relates to a portable solar kiosk to house vending machines, outdoor kitchens, parking lot payment booths, bus stop waiting areas, and the like, as well as associated battery systems, solar power assemblies, traditional power access, wiring systems and harnesses, and so forth.

BACKGROUND OF THE INVENTION

Solar panels are utilized to provide alternative power sources to power consuming devices. Solar power is useful in locations where traditional power sources are not available or reliable, such as county or state fairgrounds, craft shows, festivals, the desert, parks, athletic events, parking lots, and the like. By way of example, vending machines, outdoor kitchens, parking lot payment booths, bus stop waiting areas, and the like, all can be powered by traditional power sources. However, alternative power sources would enable use in remote locations or where traditional power is not reliable. Furthermore, alternative power sources can be used purposefully to avoid use of traditional power systems even when it is available.

Related utility patents known in the art include the following: U.S. Pat. No. 6,201,181, issued to Azzman et al. on Mar. 13, 2001, discloses a portable solar module cart. A portable solar module cart is provided which comprises a platform, a pair of wheels attached to opposite sides of the platform, a pair of support struts attached to opposite sides of the platform and movable relative to the platform between a first retracted position in which they lie substantially parallel to the platform and a second erected position in which they extend at a selected angle to the platform so that a DC power source can be disposed on and supported by the platform, a solar panel pivotally mounted to the struts, the solar panel being movable on its pivot when the struts are in their erected position so as to be in a perpendicular relationship with an imaginary line connecting the sun and the solar panel, whereby to maximize the solar energy collected by the panel, and means for locking the solar panel in any selected position on its pivot.

The foregoing patent information reflects the state of the art of which the inventors are aware and is tendered with a view toward discharging the inventors' acknowledged duty of candor in disclosing information that may be pertinent to the patentability of the technology described herein. It is respectfully stipulated, however, that the foregoing patent and other information do not teach or render obvious, singly or when considered in combination, the inventors' claimed invention.

BRIEF SUMMARY OF THE INVENTION

In various exemplary embodiments, the technology described herein provides a solar kiosk. The solar kiosk is configured for use with vending machines, outdoor kitchens, parking lot payment booths, bus stop waiting areas, and the like, as well as associated battery systems, solar power assemblies, traditional power access, wiring systems and harnesses, and so forth.

In one exemplary embodiment, the technology described herein provides a portable solar kiosk having an array of solar panels coupled one to another and mounted upon side beams supported by a base such that the array can swivel an appropriate angle to the sun. The angle of the sun relative to a particular spot on the earth varies daily, and seasonally. With the swivel, the solar kiosk can capture the sunlight at one or more of many angles. The solar array can rotate on the swivel 360 degrees in either direction. The solar power array is configured to capture sunlight and convert the captured sunlight into electricity, thereby to provide solar power to charge a battery bank and power a vending machine or other electrical device in the solar kiosk.

The base of the solar kiosk can support vending machines, payment booths, benches, and so forth. Additionally, the solar power array provides a canopy over the vending machines, payment booths, benches, and so forth, as well as persons utilizing those items. Furthermore, the canopy effect of the solar power array provides water resistance and protection from precipitation to the area immediately under the array.

The base of the solar kiosk can support battery bank assemblies, wiring harnesses, and so forth that are utilized with the solar panel array. Assemblies may include batteries, wiring harnesses, combiners, converters, charge controllers, DC disconnects, grid tie converters, traditional power options, and so forth. In an embodiment having a grid tie converters, the solar kiosk can return power to the traditional power source.

The side beams coupled to the base can be hollow to provide wiring channels. The side beams can pivot relative to the base in at least one embodiment. The side beams are integrally formed with the base in at least one embodiment. The side beams are telescoping supports in at least one embodiment.

In at least one embodiment, the solar kiosk is enclosed. By way of example, the solar kiosk is enclosed by glass, Plexiglas, or the like.

In at least one embodiment, the solar kiosk is configured with base hinges, or the like, such that the base can be folded to provide a secure containment area for a vending machine or device within the solar kiosk.

In at least one embodiment, the solar kiosk is configured with a roll-up door to provide additional security and to provide a secure containment area for a vending machine or device within the solar kiosk.

In at least one embodiment, the solar kiosk is configured for free standing vending units.

In at least one embodiment, the solar kiosk is configured for waiting areas such as bus stops.

In at least one embodiment, the solar kiosk is configured for parking lot payment booths, or other payment receipt systems.

In at least one embodiment, the solar kiosk is configured for outdoor kitchens, and the like.

In at least one embodiment the solar kiosk is configured having no base portion, wherein the solar kiosk is alternatively anchored.

In at least one embodiment, the solar kiosk also includes a battery bank assembly. The battery bank assembly includes a multiplicity of batteries electrically coupled to one another and configured to store power for supplying power to the vending machine, or like device.

In at least one embodiment, the solar kiosk also includes an inverter. The inverter is configured to convert the DC power from the battery bank into AC power for a machine also configured to utilize AC power.

In at least one embodiment, the solar kiosk also includes a combiner to combine the multiple inputs from the multiple solar panels in the solar panel array.

In at least one embodiment, the solar kiosk further includes a USB charging station with a multiplicity of USB ports.

In at least one exemplary embodiment, the solar kiosk includes: at least one beam, generally vertical and configured to arise from the ground or from a surface placed upon the ground, configured to support solar panels generally above the at least one beam and generally perpendicular to the at least one beam; a swivel configured to couple to the at least one beam generally perpendicular to the at least one beam and configured to provide a rotation relative to one of a plurality of angles to the sun; and an array of solar panels configured to capture sunlight and convert the captured sunlight into electricity to power a device within in the solar kiosk, coupled one to another, being generally planar, and mounted upon the at least one side beam, such that the solar panel array is configured for operative rotation by swivel at an appropriate angle to the sun.

The solar kiosk also can include a base configured to be coupled to the at least one beam, generally perpendicularly, configured to arise from the ground or from a surface placed upon the ground, configured to provide structural support to the solar kiosk, and configured to store at least one battery electrically coupled to the array of solar panels. The base in configured to support one or more selected from the group consisting of: a vending machine, a payment booth, an outdoor kitchen, and a sitting bench.

The solar kiosk also can include wherein the array of solar panels also is configured as a canopy over one or more items placed under the solar kiosk, and wherein the array of solar panels further is configured to provide water resistance, cover, and protection from precipitation and water to the area immediately under the array of solar panels and any one or more items placed under the solar kiosk.

The solar kiosk also can include: a battery bank assembly consisting of a plurality of rechargeable batteries rechargeable by solar energy and electrically coupled one to another and configured to store power; and a plurality of wiring harness configured to couple the battery bank assembly to the array of solar panels.

The solar kiosk also can include wherein the battery bank assembly further comprises: a combiner configured to combine a plurality of inputs from the solar panels in the solar panel array; and wherein the plurality of rechargeable batteries of the battery bank assembly is configured to be charged from the solar panel array.

The solar kiosk further can include wherein the battery bank assembly further comprises an inverter configured to convert the DC power from the battery bank assembly into AC power for a machine placed within the solar kiosk and configured to utilize AC power.

The solar kiosk further can include wherein the battery bank assembly further comprises a charge controller configured to limit a rate at which an electric current is added to or drawn from the plurality of rechargeable batteries of the battery bank assembly.

The solar kiosk further can include wherein the battery bank assembly further comprises a DC (direct current) disconnect configured to allow for disconnect of the array of solar panels from the inverter and to allow for safe maintenance of the solar kiosk.

The solar kiosk further can include wherein the battery bank assembly further comprises a grid tie converter configured to convert direct current (DC) electricity into alternating current (AC) electricity to be fed into an existing electrical grid; and a means to couple to a traditional power source. The solar kiosk can return power to a traditional power source on the existing electrical grid.

The solar kiosk further can include wherein the array of solar panels is rotatable on the swivel 360 degrees in either direction.

The solar kiosk further can include wherein the at least one beam is a pair of side beams, one coupled to the array of solar panels at opposing sides.

The solar kiosk further can include wherein the at least one beam is hollow to provide at least one wiring channel.

The solar kiosk further can include wherein the at least one beam is configured to pivot relative to the base.

The solar kiosk further can include wherein the at least one beam is integrally formed with the base.

The solar kiosk further can include wherein the at least one beam is telescoping and configured to allow a variable height of the array of solar panels.

The solar kiosk further can include wherein the solar kiosk is enclosed by a means of enclosure selecting from the group consisting of: a screen, a door, and a gate.

The solar kiosk further can include wherein the solar kiosk is configured with a roll-up door to provide additional security and to provide a secure containment area for a vending machine or device within the solar kiosk.

The solar kiosk further can include wherein the base further comprises a plurality of base hinges configured to fold to provide a secure containment area for a vending machine or device within the solar kiosk.

The solar kiosk further can include wherein the solar kiosk is configured for one from the group consisting of: a free standing vending unit; a bus stop; a payment booth, a payment receipt system, and an outdoor kitchen.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a solar kiosk. The solar kiosk is configured for use with vending machines, outdoor kitchens, parking lot payment booths, bus stop waiting areas, and the like, as well as associated battery systems, solar power assemblies, traditional power access, wiring systems and harnesses, and so forth.

Figure 1:
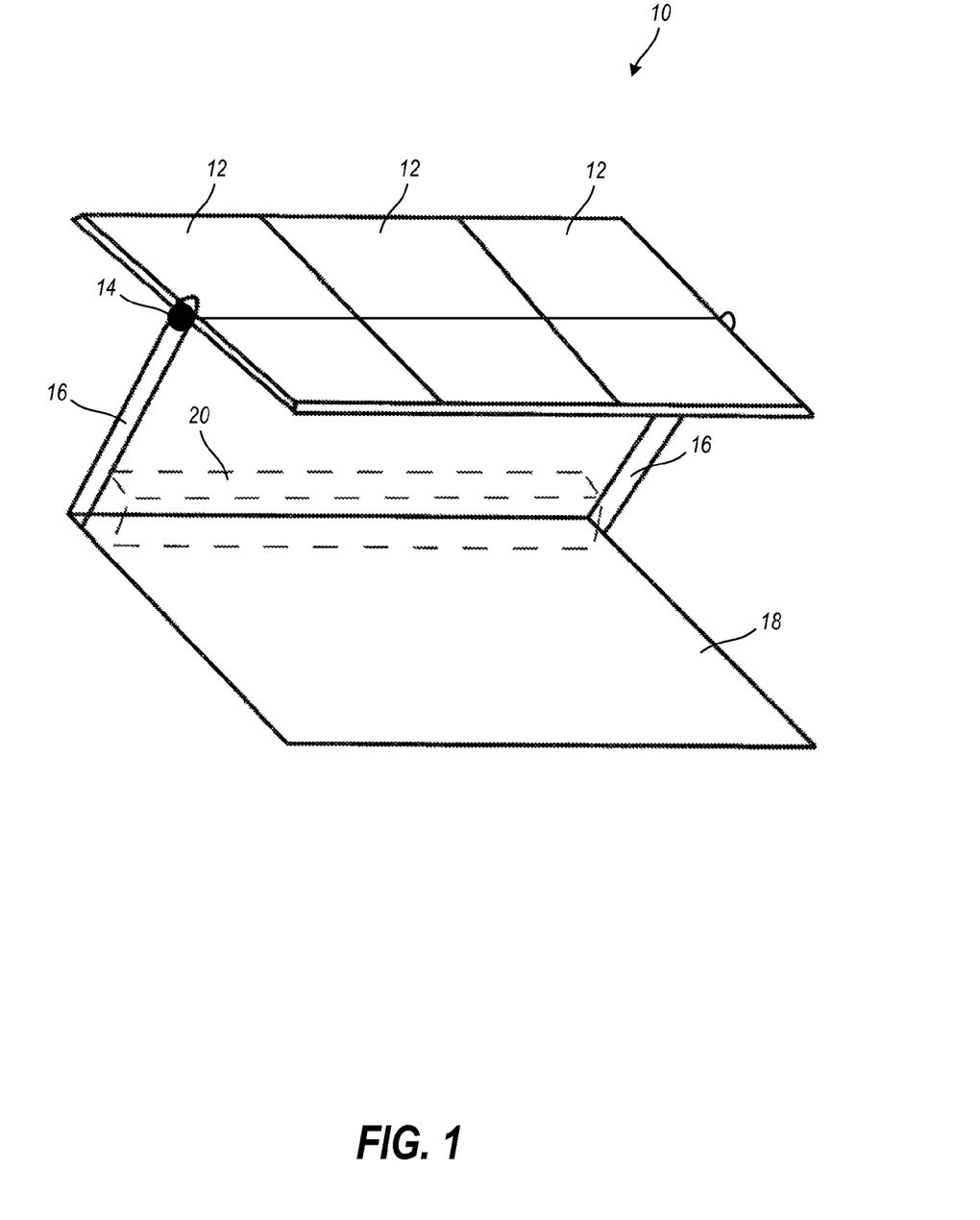
FIG. 1 is a front perspective view of a portable solar kiosk, illustrating, in particular, multiple solar panels, swivel-mounted upon side beams coupled to a base, according to an embodiment of the technology described herein.

Referring now to FIG. 1, a front perspective view of a solar kiosk 10 is shown. The solar kiosk 10 includes a multiplicity of solar panels 12. As depicted the solar kiosk 10 includes six solar panels 12 arranged in a two-by-three grid. The six solar panels 12 are coupled one to another in a solar panel array. The arrangement, number, and type of the solar panels 12 can vary based on power needs of the device they are to power and other manufacturing and use considerations. Additionally, the number and placement of the solar panels 12 in the solar panel array can be varied in order to optimize the capture of sunlight.

Figure 3:
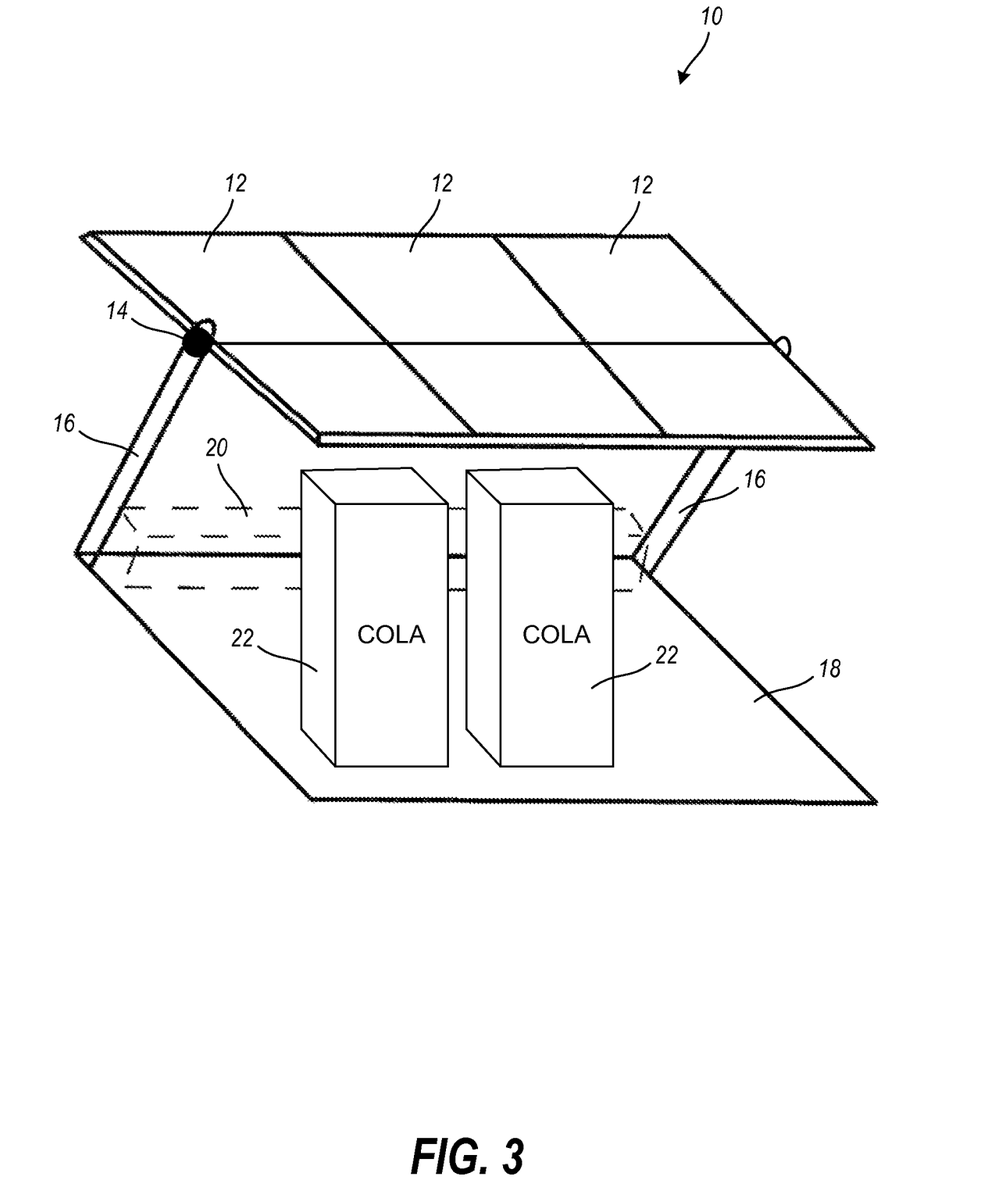
FIG. 3 is a front perspective view of the portable solar kiosk depicted in FIG. 1, illustrating, in particular, use coupled with vending machines, to provide a solar powered vending kiosk, according to an embodiment of the technology described herein.
Figure 5:
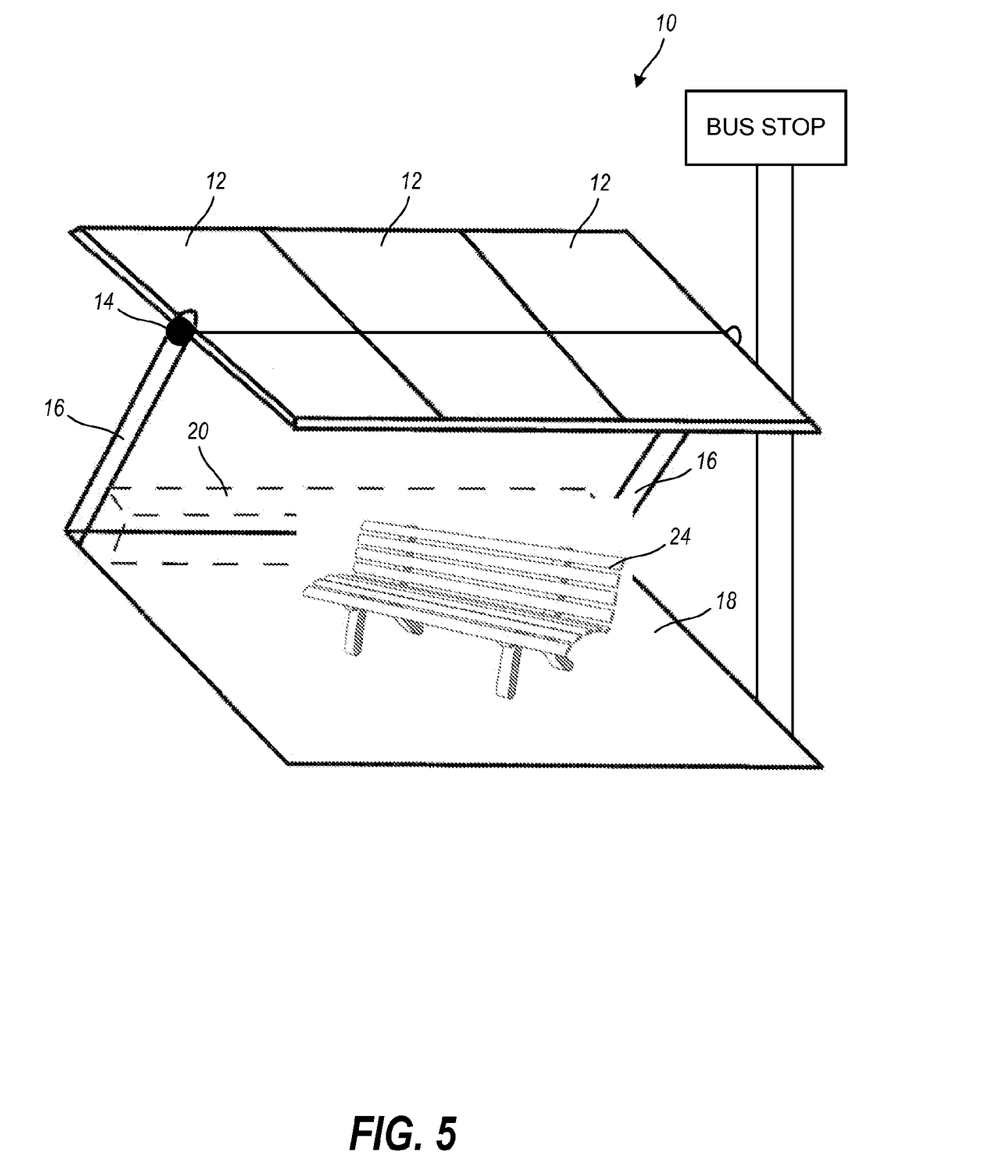
FIG. 5 is a front perspective view of the portable solar kiosk depicted in FIG. 1, illustrating, in particular, use coupled with at least one seating area for a bus stop, according to an embodiment of the technology described herein.

The solar kiosk 10 is configured for use with vending machines, outdoor kitchens, parking lot payment booths, USB charging stations, bus stop waiting areas, and the like, as well as associated battery systems, solar power assemblies, traditional power access, wiring systems and harnesses, and so forth. By way of example, the multiplicity of solar panels 12 can charge batteries 20 to power a vending machine (such as depicted in FIG. 3) or a bus stop (such as depicted in FIG. 5) or other application. It at least one embodiment, the solar kiosk 10 is configured to charge a USB charging station, such that persons at the kiosk can charge a USB portable electronic device. By way of example, in an embodiment wherein the solar kiosk 10 is a bus stop, one may charge a USB device while waiting.

The solar kiosk 10 includes side beams 16 supported by a base 18 such that the solar panel array 12 can swivel on swivel rod 14 to an appropriate angle to the sun. It at least one embodiment, only one side beam 16 is utilized. The angle of the sun relative to a particular spot on the earth varies daily, and seasonally. With the swivel 14, the solar kiosk 10 can capture the sunlight at one or more of many angles. The solar array 12 can rotate on the swivel 14 for 360 degrees in either direction. The swivel 14 can be rotated operatively by a user. In at least one embodiment, the swivel 14 can be set up automatically, such as for example by a motor, to rotate at a predetermined schedule. The solar power array 12 is configured to capture sunlight and convert the captured sunlight into electricity, thereby to provide solar power to charge a battery bank 30 and power a vending machine, USB charging station 80, or other electrical device in the solar kiosk 10.

The base 18 of the solar kiosk 10 can support battery bank assemblies 20, USB charging stations 80, wiring harnesses, and so forth that are utilized with the solar panel array 12. Assemblies may include batteries, wiring harnesses, combiners, converters, charge controllers, DC disconnects, grid tie converters, traditional power options, and so forth. In an embodiment utilizing a grid tie converter, the solar kiosk 10 can return excess power from the solar panel array 12 to the traditional power source system.

The side beams 16 coupled to the base can be hollow to provide wiring channels. Hollow side beams 16 allows for all wiring, and the like, to be wholly or largely concealed from sight. The side beams 16 pivot relative to the base 18 in at least one embodiment, thereby allowing for additional angles of use. The side beams 16 are integrally formed with the base 18 in at least one embodiment. The side beams 16 are telescoping supports in at least one embodiment, thereby allowing the height of the solar panel array 12 to be operatively adjusted.

Figure 9:
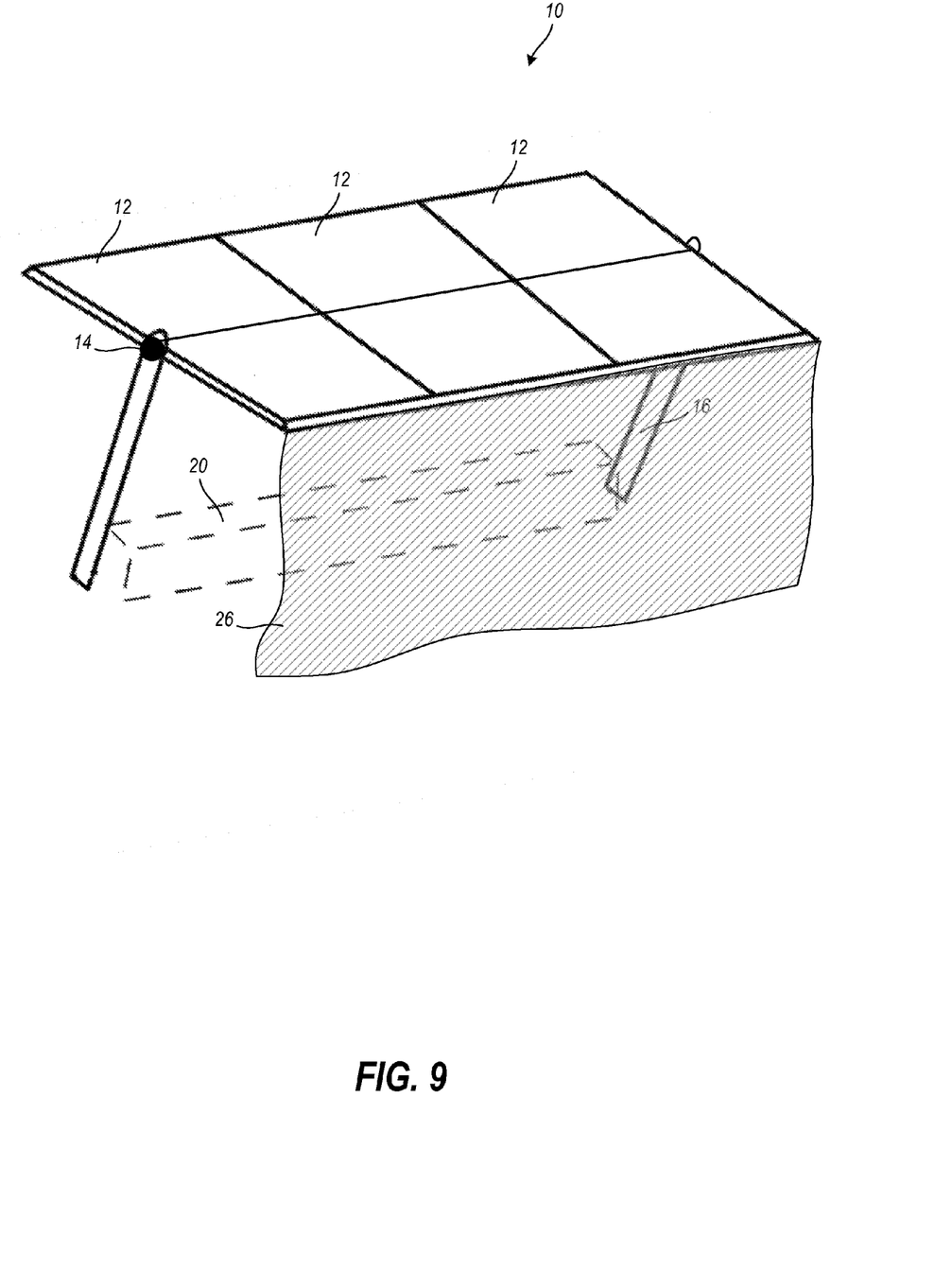
FIG. 9 is a front perspective view of a portable solar kiosk depicted, illustrating, in particular, an embodiment having no base, according to an embodiment of the technology described herein.

In at least one embodiment, the solar kiosk 10 is enclosed. By way of example, the solar kiosk 10 is enclosed by glass, Plexiglas, or the like. By way of example, FIG. 9 depicts a partial enclosure 26 to the solar kiosk 10. Such walls, screens, doors, or folded base portions are utilized around the entire solar kiosk 10 in at least one embodiment.

Figure 8:
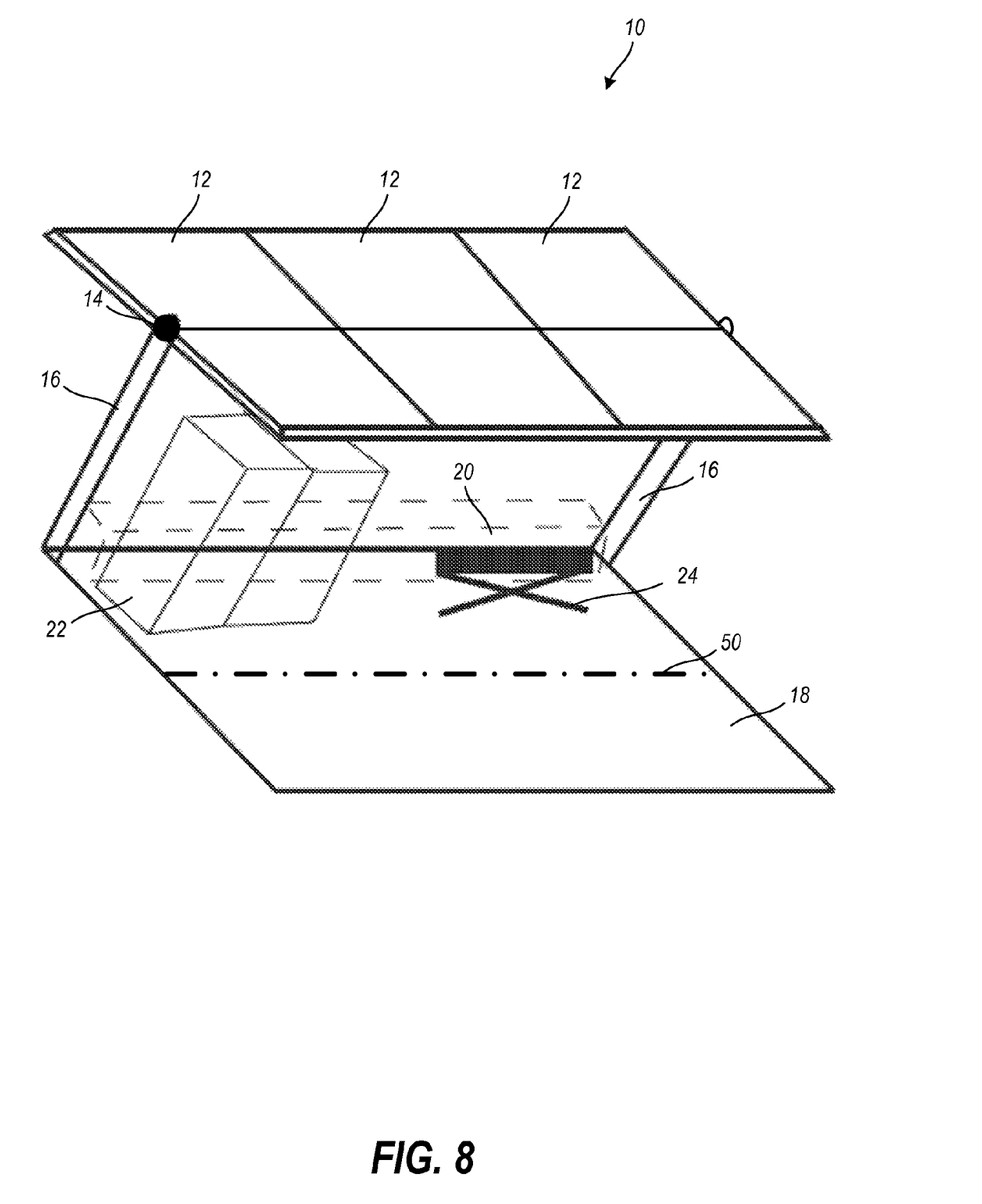
FIG. 8 is a front perspective view of the portable solar kiosk depicted in FIG. 1, illustrating, in particular, use coupled with a vending machine and a park bench, to provide a solar powered vending kiosk and a seating area, according to an embodiment of the technology described herein.

In at least one embodiment, the solar kiosk 10 is configured with base hinges 50, or the like, such that the base 18 can be folded to provide a secure containment area for a vending machine or device within the solar kiosk 10. By way of example, and as depicted in FIG. 8, base hinges 50 provide a means for the base 18 to be folded upwardly and create an enclosure to secure items stored within the solar kiosk 10. The base hinges 50 also provide a means to make the base 18 more easily transported and stored.

In at least one embodiment, the solar kiosk 10 is configured with a roll-up door (see, for example, 26 on FIG. 9) to provide additional security and to provide a secure containment area for a vending machine or device within the solar kiosk 10. This vending machine embodiment is more specifically depicted in FIG. 3.

In at least one embodiment, the solar kiosk 10 is configured for free standing vending units. This vending machine embodiment is more specifically depicted in FIG. 3.

In at least one embodiment, the solar kiosk 10 is configured for waiting areas such as bus stops. This bus stop embodiment is depicted more specifically in FIG. 5.

In at least one embodiment, the solar kiosk 10 is configured for parking lot payment booths, or other payment receipt systems.

In at least one embodiment, the solar kiosk 10 is configured for outdoor kitchens, and the like.

Figure 2:
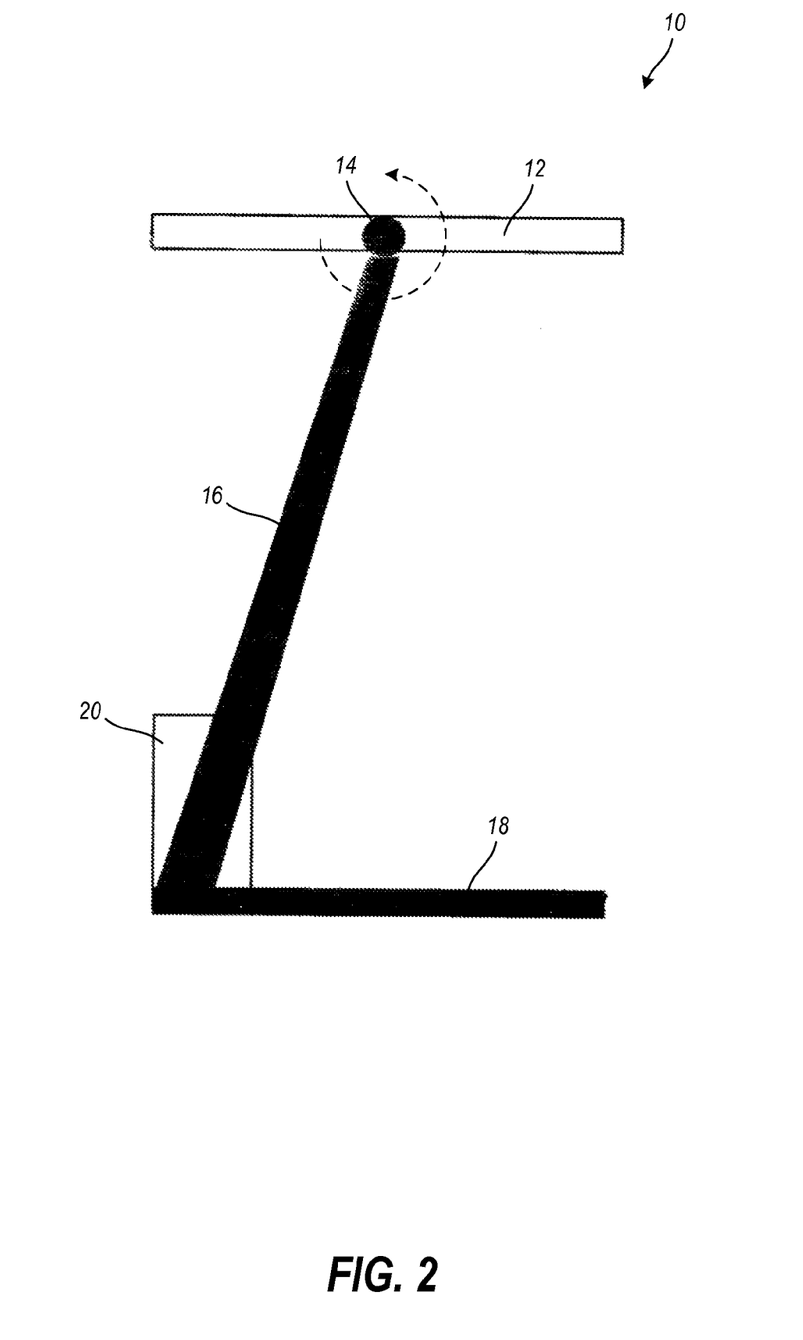
FIG. 2 is a side view of the portable solar kiosk depicted in FIG. 1, illustrating, in particular, the solar panel swivel for sun angle adjustments, according to an embodiment of the technology described herein.

Referring now to FIG. 2, a side view of the portable solar kiosk 10 depicted in FIG. 1.

Referring now to FIG. 3, a front perspective view of the portable solar kiosk 10 depicted in FIG. 1, illustrating, in particular, use coupled with vending machines 22, to provide a solar powered vending kiosk. One or more vending machines are powered by battery bank 20 that is charged by solar panel array 12.

Figure 4:
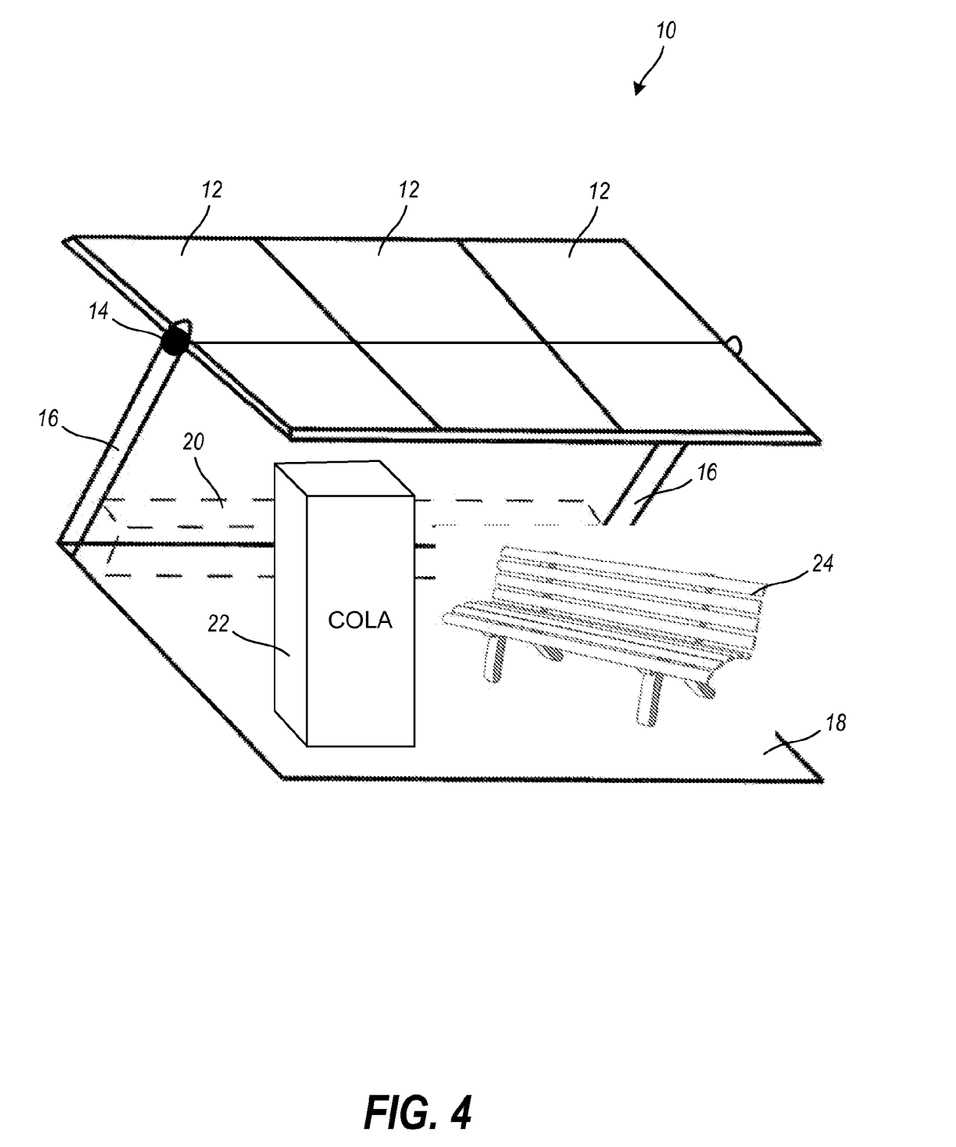
FIG. 4 is a front perspective view of the portable solar kiosk depicted in FIG. 1, illustrating, in particular, use coupled with a vending machine and a park bench, to provide a solar powered vending kiosk and a seating area, according to an embodiment of the technology described herein.

Referring now to FIG. 4, a front perspective view of the portable solar kiosk 10 depicted in FIG. 1, illustrating, in particular, use coupled with a vending machine 22 and a park bench 24, to provide a solar powered vending kiosk and a seating area, is shown.

Referring now to FIG. 5, a front perspective view of the portable solar kiosk 10 depicted in FIG. 1, illustrating, in particular, use coupled with at least one seating area 24 for a bus stop, is shown.

Figure 6:
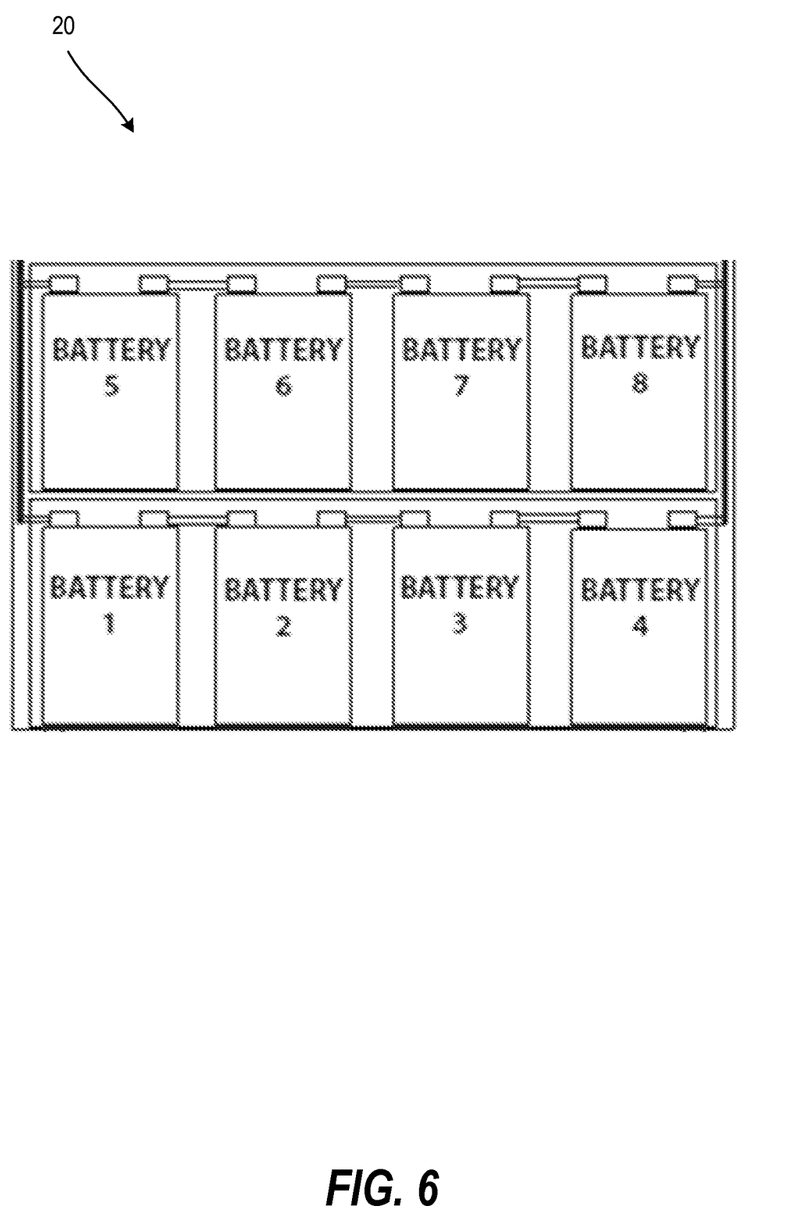
FIG. 6 is a schematic diagram of a battery bank assembly charged by the solar panel array, according to an embodiment of the technology described herein.

Referring now to FIG. 6, is a schematic diagram of a battery bank assembly 20 charged by the solar panel array 12, is shown. In at least one embodiment, the solar kiosk 10 also includes a battery bank assembly 20. The battery bank assembly 20 includes a multiplicity of batteries electrically coupled to one another and configured to store power for supplying power to the vending machine, or like device.

Figure 7:
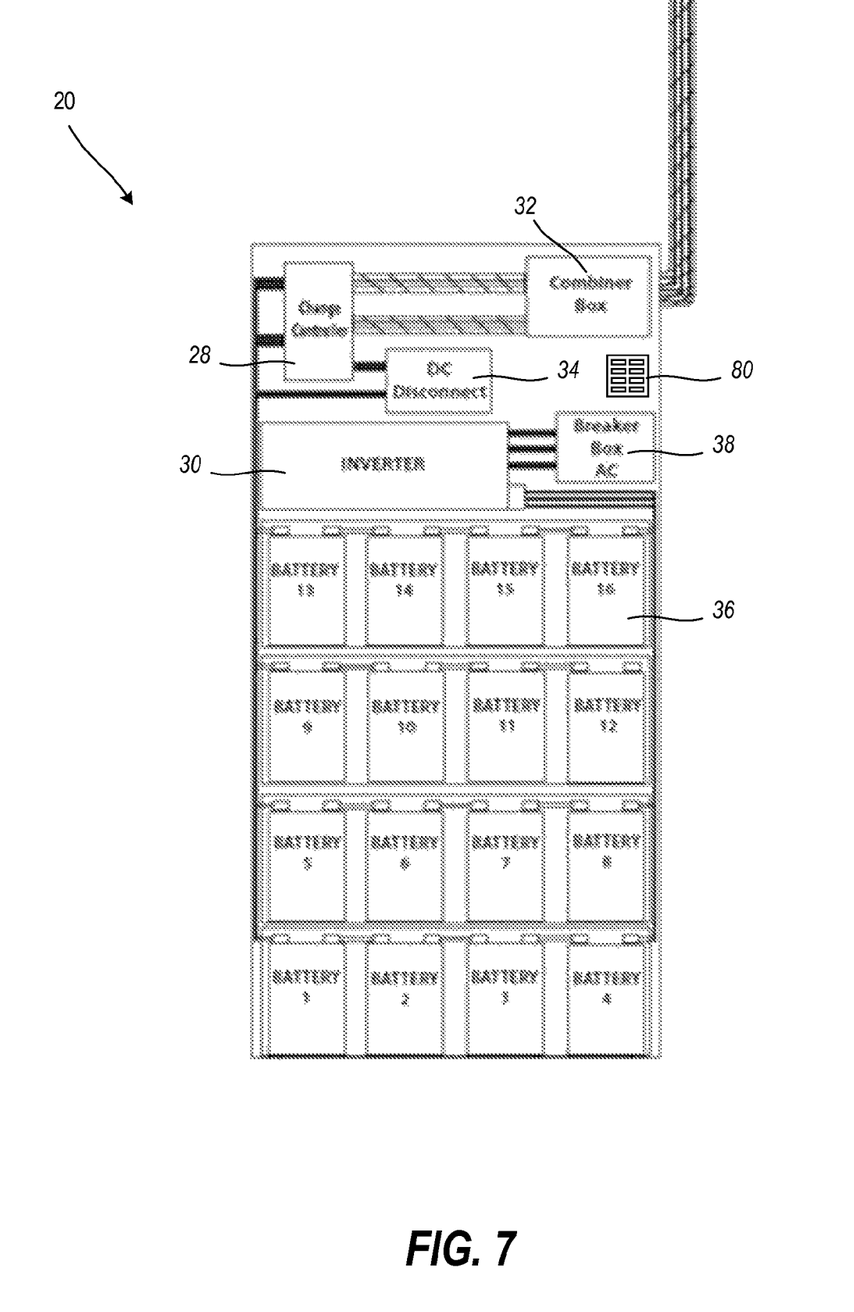
FIG. 7 is a schematic diagram a battery bank assembly charged by the solar panel array and a USB charging station, an inverter, breaker box, combiner and DC connect, according to an embodiment of the technology described herein.

Referring now to FIG. 7, a schematic diagram a battery bank assembly 20 charged by the solar panel array and a charge controller 28, an inverter 30, breaker box 38, combiner 32, and DC connect 34, are shown.

The battery bank assembly 20 can include an inverter 30. The inverter 30 is configured to convert the DC power from the battery bank 20 into AC power for a machine also configured to utilize AC power.

The battery bank assembly 20 can include a combiner 32 to combine the multiple inputs from the multiple solar panels 12 in the solar panel array.

The solar kiosk 10 further can include wherein the battery bank assembly 20 further includes a charge controller 28 configured to limit a rate at which an electric current is added to or drawn from the plurality of rechargeable batteries of the battery bank assembly.

The solar kiosk 10 further can include wherein the battery bank assembly further includes a DC (direct current) disconnect 34 configured to allow for disconnect of the array of solar panels 12 from the inverter and to allow for safe maintenance of the solar kiosk 10.

The solar kiosk further can include wherein the battery bank assembly further includes a grid tie converter (not shown) configured to convert direct current (DC) electricity into alternating current (AC) electricity to be fed into an existing electrical grid; and a means to couple to a traditional power source. The solar kiosk can return power to a traditional power source on the existing electrical grid.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A solar kiosk comprising:
at least one beam, generally vertical and configured to arise from the ground or from a surface placed upon the ground, configured to support solar panels generally above the at least one beam and generally perpendicular to the at least one beam;
a swivel configured to couple to the at least one beam generally perpendicular to the at least one beam and configured to provide a rotation relative to one of a plurality of angles to the sun; and
an array of solar panels configured in shape of an overhead canopy to rotate on the swivel 360 degrees in either direction and to capture sunlight and convert the captured sunlight into electricity to power a device within in the solar kiosk, coupled one to another, being generally planar, and mounted upon the at least one side beam, such that the solar panel array is configured for operative rotation by swivel at an appropriate angle to the sun; wherein the array of solar panels also is configured as a canopy over persons and one or more items placed under the solar kiosk, and wherein the array of solar panels further is configured to provide water resistance, cover, and protection from precipitation and water to the area immediately under the array of solar panels and any persons and one or more items placed under the solar kiosk.

2. The solar kiosk of claim 1, further comprising:
a base configured to be coupled to the at least one beam, generally perpendicularly, configured to arise from the ground or from a surface placed upon the ground, configured to provide structural support to the solar kiosk, and configured to store at least one battery electrically coupled to the array of solar panels.

3. The solar kiosk of claim 2, wherein the base in configured to support one or more selected from the group consisting of: a vending machine, a payment booth, an outdoor kitchen, and a sitting bench.

4. The solar kiosk of claim 1, further comprising:
a battery bank assembly consisting of a plurality of rechargeable batteries rechargeable by solar energy and electrically coupled one to another and configured to store power; and
a plurality of wiring harness configured to couple the battery bank assembly to the array of solar panels.

5. The solar kiosk of claim 4, wherein the battery bank assembly further comprises:
a combiner configured to combine a plurality of inputs from the solar panels in the solar panel array;
wherein the plurality of rechargeable batteries of the battery bank assembly is configured to be charged from the solar panel array.

6. The solar kiosk of claim 4, wherein the battery bank assembly further comprises:

a inverter configured to convert the DC power from the battery bank assembly into AC power for a machine placed within the solar kiosk and configured to utilize AC power.

7. The solar kiosk of claim 4, wherein the battery bank assembly further comprises:
a charge controller configured to limit a rate at which an electric current is added to or drawn from the plurality of rechargeable batteries of the battery bank assembly.

8. The solar kiosk of claim 4, wherein the battery bank assembly further comprises:
a DC (direct current) disconnect configured to allow for disconnect of the array of solar panels from the inverter and to allow for safe maintenance of the solar kiosk.

9. The solar kiosk of claim 4, wherein the battery bank assembly further comprises:
a grid tie converter configured to convert direct current (DC) electricity into alternating current (AC) electricity to be fed into an existing electrical grid; and
a means to couple to a traditional power source;
wherein the solar kiosk can return power to a traditional power source on the existing electrical grid.

10. The solar kiosk of claim 1, wherein the array of solar panels is rotatable on the swivel 360 degrees in either direction.

11. The solar kiosk of claim 1, wherein the at least one beam is a pair of side beams, one coupled to the array of solar panels at opposing sides.

12. The solar kiosk of claim 1, wherein the at least one beam is hollow to provide at least one wiring channel.

13. The solar kiosk of claim 2, wherein the at least one beam is configured to pivot relative to the base.

14. The solar kiosk of claim 2, wherein the at least one beam is integrally formed with the base.

15. The solar kiosk of claim 1, wherein the at least one beam is telescoping and configured to allow a variable height of the array of solar panels.

16. The solar kiosk of claim 1, wherein the solar kiosk is enclosed by a means of enclosure selecting from the group consisting of: a screen, a door, and a gate.

17. The solar kiosk of claim 1, wherein the solar kiosk is configured with a roll-up door to provide additional security and to provide a secure containment area for a vending machine or device within the solar kiosk.

18. The solar kiosk of claim 2, wherein the base further comprises:
a plurality of base hinges configured to fold to provide a secure containment area for a vending machine or device within the solar kiosk.

19. The solar kiosk of claim 1, wherein the solar kiosk is configured for one from the group consisting of: a free standing vending unit; a bus stop; a payment booth, a payment receipt system, and an outdoor kitchen.

* * * * *